United States Patent
Lemoff

(10) Patent No.: US 11,971,614 B2
(45) Date of Patent: *Apr. 30, 2024

(54) DYNAMIC PRESBYOPIA CORRECTION IN ELECTRONIC CONTACT LENSES

(71) Applicant: Tectus Corporation, Saratoga, CA (US)

(72) Inventor: Brian Elliot Lemoff, Morgan Hill, CA (US)

(73) Assignee: Tectus Corporation, Saratoga, CA (US)

( * ) Notice: Subject to any disclaimer, the term of this patent is extended or adjusted under 35 U.S.C. 154(b) by 753 days.

This patent is subject to a terminal disclaimer.

(21) Appl. No.: 16/951,928

(22) Filed: Nov. 18, 2020

(65) Prior Publication Data

US 2021/0072561 A1    Mar. 11, 2021

Related U.S. Application Data

(63) Continuation of application No. 16/228,288, filed on Dec. 20, 2018, now Pat. No. 10,871,660.

(51) Int. Cl.
*G02C 7/04* (2006.01)
*A61B 3/02* (2006.01)
(Continued)

(52) U.S. Cl.
CPC ............. *G02C 7/041* (2013.01); *G02C 7/049* (2013.01); *G02C 11/10* (2013.01); *G02F 1/29* (2013.01); *G06F 3/013* (2013.01); *G02F 1/294* (2021.01)

(58) Field of Classification Search
CPC .. A61F 9/026; G02C 7/00; G02C 7/04; G02C 7/02; G02C 7/024; A61B 3/02; A61B 3/102; A61B 3/025; A61B 3/113; A61B 3/1015; A61B 3/1225
USPC ..... 351/159.03, 159.01, 200, 205, 206, 209, 351/210, 221, 222, 247, 246, 41, 159.39, 351/159.73, 159.77
See application file for complete search history.

(56) References Cited

U.S. PATENT DOCUMENTS 6,851,805 B2   2/2005   Blum
9,366,881 B2   6/2016   Pugh
(Continued)

OTHER PUBLICATIONS

Bailey, J. et al., "Switchable Liquid Crystal Contact Lenses for the Correction of Presbyopia," Crystals, vol. 8, Issue 1, 2018, 24 pages.
(Continued)

*Primary Examiner* — Dawayne Pinkney
(74) *Attorney, Agent, or Firm* — Fenwick & West LLP

(57) ABSTRACT

A contact lens comprises a variable focal length lens embedded within the contact lens and a plurality of oxygen channels extending from an oxygen-permeable outer layer of the contact lens to an oxygen-permeable inner layer of the contact lens. The variable focal length lens is embedded within a non-oxygen-permeable core layer of the contact lens. The contact lens comprises a controller configured to change the operating mode of the contact lens by adjusting the focal distance of the variable focal length lens, for instance in response to an input from a user or in response to determining that the user is looking at a nearby object. For instance, the controller can configure the contact lens to operate in a reading mode or in a normal focus mode.

20 Claims, 5 Drawing Sheets

(51) Int. Cl.
*A61B 3/10* (2006.01)
*G02C 7/02* (2006.01)
*G02C 11/00* (2006.01)
*G02F 1/29* (2006.01)
*G06F 3/01* (2006.01)

(56) References Cited

U.S. PATENT DOCUMENTS

| | | | |
|---|---|---|---|
| 9,642,699 B2 | 5/2017 | Wortz | |
| 9,775,513 B1 | 10/2017 | Ho | |
| 9,789,217 B2 | 10/2017 | Goncalves Da Costa | |
| 2012/0250152 A1* | 10/2012 | Larson | G02B 30/25 359/464 |
| 2013/0308092 A1* | 11/2013 | Groisman | G02C 7/04 351/159.04 |
| 2014/0240665 A1* | 8/2014 | Pugh | A61B 3/112 351/205 |
| 2016/0081793 A1 | 3/2016 | Galstian | |
| 2016/0106533 A1 | 4/2016 | Galstian | |
| 2016/0170097 A1 | 6/2016 | Milton | |
| 2017/0003539 A1 | 1/2017 | Nystrom | |
| 2017/0299892 A1* | 10/2017 | Pugh | G02C 7/049 |
| 2018/0088351 A1 | 3/2018 | Kennedy | |
| 2018/0088352 A1 | 3/2018 | Kennedy | |
| 2018/0217402 A1 | 8/2018 | Larmagnac | |
| 2018/0224671 A1* | 8/2018 | Lemoff | G02C 7/047 |
| 2019/0076021 A1 | 3/2019 | Araci | |
| 2019/0107734 A1* | 4/2019 | Lee | G02C 7/083 |

OTHER PUBLICATIONS

De Smet, J. et al., "Design and Wrinkling Behavior of a Contact Lens with an Integrated Liquid Crystal Light Modulator," Journal of Display Technology, May 2012, vol. 8, No. 5, pp. 299-305.
De Smet, J., "The Smart Contact Lens: from an Artificial Iris to a Contact Lens Display," Ghent University: Faculty of Engineering and Architecture, Feb. 5, 2014, 223 pages.
Gleeson, H., "Looking—into the future," Physics World, Feb. 15, 2018, 5 pages, [Online] Retrieved from the internet <URL:https://physicsworld.com/a/looking-into-the-future/>.
Kaur, S. et al., "Graphene electrodes for adaptive liquid crystal contact lenses," Optics Express, vol. 24, Issue 8, 2016, pp. 8782-8787.
Li, G. et al., "Switchable electro-optic diffractive lens with ihgh efficiency for ophthalmic applications," PNAS, Apr. 18, 2006, vol. 103, No. 16, pp. 6100-6104.
Syed, I.M. et al., "Novel switching mode in a vertically aligned liquid crystal contact lens," Optics Express, vol. 23, Issue 8, Apr. 20, 2015, pp. 9911-9916.
Wu, Y. et al., "Design of retinal-projection-based near-eye display with contact lens," Optics Express, Apr. 30, 2018, vol. 26, No. 9, pp. 11553-11567.

* cited by examiner

DYNAMIC PRESBYOPIA CORRECTION IN ELECTRONIC CONTACT LENSES

CROSS-REFERENCE TO RELATED APPLICATION(S)

This application is a continuation of U.S. patent application Ser. No. 16/228,288, "Dynamic Presbyopia Correction in Electronic Contact Lenses," filed Dec. 20, 2018. The subject matter of all of the foregoing is incorporated herein by reference in their entirety.

BACKGROUND

1. Technical Field

This disclosure relates generally to eye-mounted displays and, more particularly, to electronic contact lenses that correct presbyopia.

2. Description of Related Art

Electronic contact lenses can perform a number of functions, for instance using tiny video projectors (or "femto-projectors") as described in Deering (U.S. Pat. No. 8,786,675) to implement an AR system. The potential for electronic contact lenses to include specialized electronic components makes them an attractive mechanism to address a variety of eye conditions.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Introduction

Presbyopia is an eye condition that affects people over 40. It usually becomes noticeable in the early to mid-40s and may continue to worsen until age 65. It is a consequence of age-related hardening of the lens of the eye which reduces the ability of the lens to change focal distance.

An electronic contact lens with an embedded, variable focal length lens can address presbyopia. Whenever the electronic contact lens is configured to operate in a reading mode, the focal length of the variable focal length lens can be adjusted to enable a user with presbyopia to focus on close objects. The variable focal length lens can be flat or curved, and its focal length can be adjusted by varying an input current, voltage, and/or signal frequency.

The contact lens can be configured to operate in the reading mode in response to an input from a user. The input can be a hand gesture, an eye gesture, a voice command, or an input received via a connected device. The contact lens can also be configured to operate in the reading mode without an explicit input from a user, for instance in response to detecting an object that is near in distance to the user's eyes, in response to detecting a vergence of the user's eyes, or in response to detecting that the user's eyes are looking downwards towards the base of the user's head. This reading mode can also be activated for other activities where the user may have to focus on elements close to the eye, such as threading a needle.

Electronic Contact Lens Architecture with Variable Focal Length Lens

Figure 1:
FIG. 1 (FIG. 1) is an illustration of user wearing an electronic contact lens system.

Turning now to the figures, FIG. 1 is an illustration of a person wearing an electronic contact lens system 100. The electronic contact lens system 100 includes a power source and an electronic contact lens 120 ("contact lens"). The power source may include a battery embedded within the contact lens 120, for instance a battery that can be inductively charged via an electronic contact case while the user is not wearing the contact lens. The contact lens 120 may also wirelessly couple to an external device, such as the necklace 110, in order to receive power and to send and receive data. For example, the contact lens 120 can include various electronic components that can convert an electromagnetic field into power, and that may be configured by or operate in response to control signals received from the necklace 110.

The contact lens 120 can also include other components such as antennae or optical/infrared photodetectors, data storage and buffering, controls, and a calibration system (including, for instance, a motion detection system). In addition, the contact lens 120 can include positioning components such as accelerometers, magnetometers, and gyroscopes used for motion detection, eye tracking, and head tracking. Finally, the contact lens 120 can also include data processing components, such as microprocessors, microcontrollers, and other data processing elements.

The electronic contact lens system of FIG. 1 may feel natural to the wearer because the contact lenses 120 and the necklace 110 are similar to normal contacts lenses and necklaces used in everyday life. The necklace 110 may include additional hardware elements within its band 130 that can provide added functionality to the electronic contact lens system. For example, the necklace can communicatively couple to a smartphone, can receive configuration/reading mode instructions from an application running on the smartphone, and can provide the instructions to the contact lens. The necklace may also replace the smartphone rather than merely communicate with it.

The power source for the electronic contact lens may be a small battery embedded within the contact lens 120. It may be rechargeable, for instance using a photovoltaic cell or using a circuit that converts a time varying magnetic field ("TVMF") into an electric current to charge the battery. This TVMF may be generated by the necklace 110, or may be generated by an electronic contact case that charges the battery while the user is not wearing the contact lens. In other embodiments the power source may be integrated into a wearable device, such as a necktie, a scarf, a belt, the brim of a hat, the collar of a shirt, the hood of a jacket, the sleeve of a sweater, the front of a t-shirt, etc. In other examples, the power source can be an external device or structure. As an example, the power source can be a smart phone, a table-top box, or a power source coupled to the walls of an office.

Figure 2:
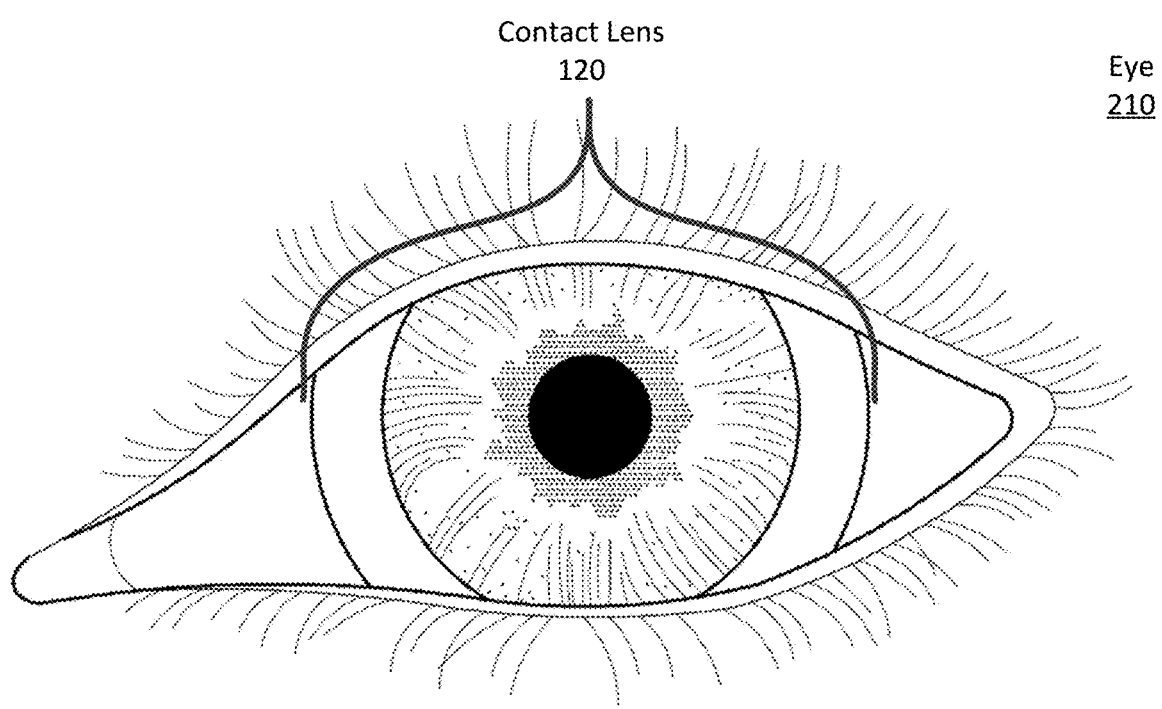
FIG. 2 is an illustration of the wearer's eye with the electronic contact lens system.

FIG. 2 is an illustration of a close up view of the wearer's eye with the electronic contact lens system, according to an embodiment. The contact lens 120 placed on the surface of the user's eye 210. The center of the surface of the contact lens 120 aligns with the user's visual axis, i.e., is aligned along an axis that is normal to the center of the user's iris. The electronic contact lens 120 transmits about as much light as an ordinary contact lens. In one embodiment, the contact lens 120 has a custom shape that conforms to the shape of the user's eye, such that the contact lens 120 remains aligned within about a millimeter of the visual axis of the eye.

Figure 3:
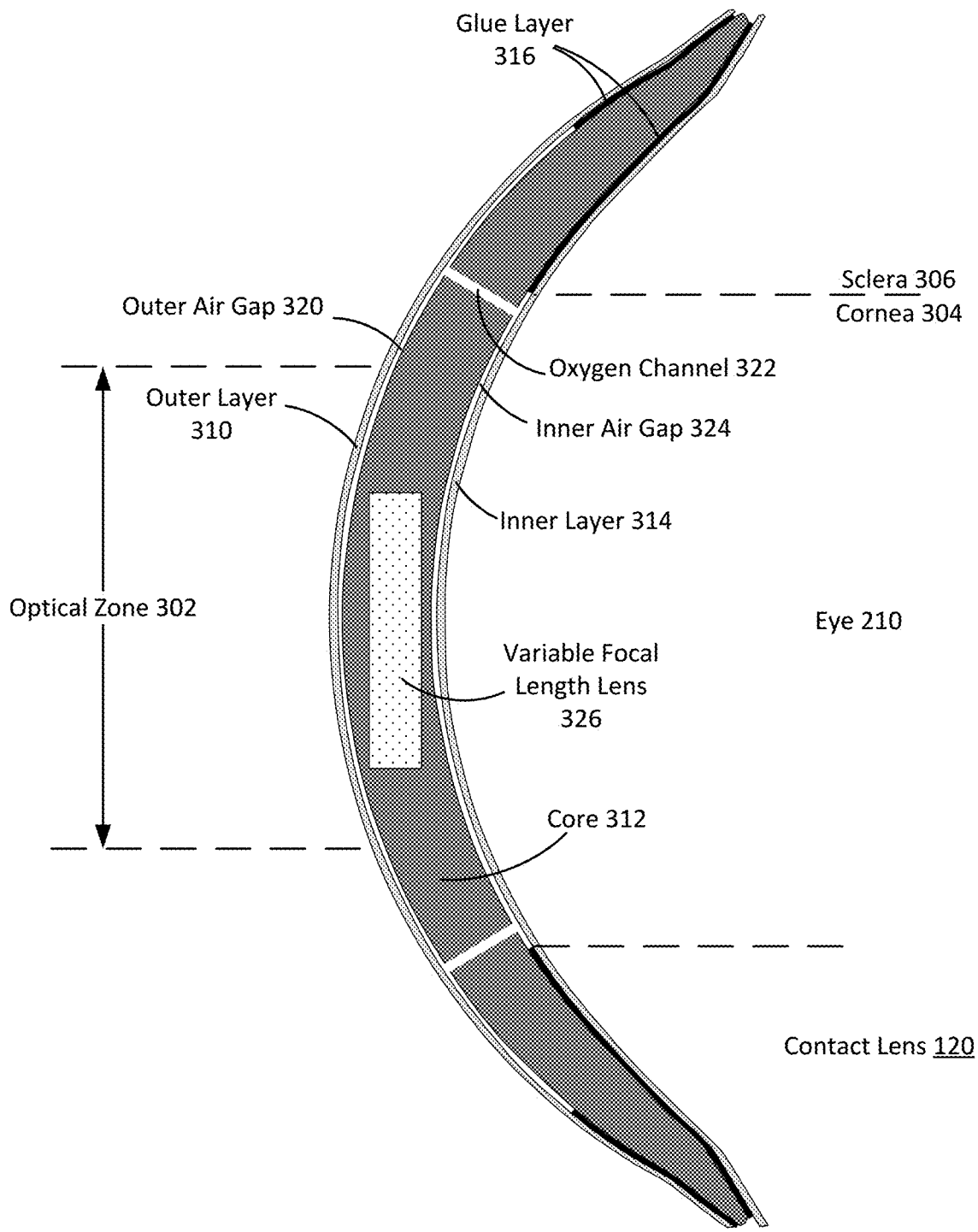
FIG. 3 is a cross sectional view of a dual-gap contact lens with an embedded variable focal length lens.

FIG. 3 is a cross sectional view of a dual-gap contact lens with embedded variable focal length lens 326, according to an embodiment. The contact lens 120 is a scleral contact lens with an outer layer 310, a middle layer or core 312, and an inner layer 314. When the contact lens is worn, the inner layer 314 contacts a tear fluid layer on the eye and the outer layer 310 is exposed to air (except when the wearer closes their eye or blinks). For reference, the locations on the eye 210 corresponding to the cornea 304 and sclera 306 are shown. This indicates the boundary between the sclera 306 and the cornea 304 on the surface of the eye 210. The outer layer 310 and inner layer 314 are relatively thin and are made of materials that are permeable to oxygen, such as rigid gas permeable ("RGP") plastic. The core 312 is sufficiently thick to accommodate the payload, such as the variable focal length lens 326. It may also be made from an oxygen permeable material such as RGP or from an oxygen impermeable material such as poly(methyl methacrylate) ("PMMA"). Other oxygen permeable materials may be substituted for RGP and other oxygen permeable or impermeable materials may be substituted for PMMA. In some embodiments, the core 312 has a thickness such that a conventional scleral lens having the thickness and material of the core 312 would have insufficient oxygen transmission to the user's eye. Additional details regarding such a dual-gap contact lens are described in U.S. Pat. No. 10,095,051, filed Jan. 31, 2018, which is incorporated by reference herein in its entirety.

The outer layer 310, core 312, and inner layer 314 are bonded to each other via glue layers 316 near the periphery of the contact lens 120, outside the optical zone 302. Suitable glues for the glue layers 316 include medical grade optical cement.

In the illustrated embodiment, within the optical zone and out to the radius of the glue layers 316, the outer layer 310 is separated from the core 312 by an outer air gap 320. In addition, the inner layer 314 is separated from the core 312 by an inner air gap 324. In some embodiments, the glue layer 316 bonding the inner layer 314 to the core 312 is outside the cornea 304, such that the inner air gap 324 laterally overlaps with substantially all of the wearer's cornea 304. The outer air gap 320 and/or the inner air gap 324 may contain spacers (not shown) used to maintain gap distance and overall structural integrity of the contact lens structure. The core 312 may have an anti-reflection coating on either or both of its surfaces in order to reduce optical reflections at the interface between the core 312 and the outer and inner air gaps 320/324.

The outer air gap 320 and inner air gap 324 are connected via oxygen channels 322, some of which pass through the core 312. The channels 322 may be holes formed in the core 312. They serve as passageways for oxygen from the outer air gap 320 to reach the inner air gap 324. In some embodiments, the channels 322 are oriented substantially vertically and pass through the entire thickness of the core 312. The channels 322 may be drilled through the core 312 or may be formed as part of a molding process for forming the core. The channels 322 may each have a substantially uniform cross-section (e.g., circular cross-section), for example with diameters ranging from about 5 um to about 0.5 mm.

Because the outer layer 310 is exposed to air, oxygen is able to diffuse from the surrounding air through the oxygen permeable material of the outer layer 310 to the outer air gap 320. The oxygen collected in the outer air gap 320 diffuses rapidly through the oxygen channels 322 to the inner air gap 324, where it may diffuse through the oxygen permeable material of the inner layer 314 to reach the tear fluid layer and underlying cornea of the wearer. If the inner air gap 324 covers a large portion of the wearer's cornea, oxygen may be fairly evenly distributed across the wearer's cornea through the inner layer 314.

Because oxygen diffusion through the air (such as the air in the gaps 320/324 and the shafts 322) is roughly 100,000 times more rapid than diffusion through permeable solids such as RGP, the oxygen transmissibility of the contact lens 120 is defined primarily by the thicknesses of the outer layer 310 and inner layer 314, and not by thickness of the air gaps 320/324 or the core 312. For example, consider a lens in which the collection underlayer and distribution overlayer have equal areas. If each of the outer layer 310 and inner layer 314 of contact lens 120 has a thickness of 100 um, and is made of an RGP material having "Dk"=100, then the total "Dk/t" of the entire contact lens 120 will be approximately 50. In other words, "Dk/t" of the entire contact lens 120 is substantially similar to the "Dk/t" for a 200 um thick layer of RGP material. The thicknesses of air gaps 320/324, diameters of channels 322, and number of channels 322 in the contact lens 120 are selected to ensure that the Dk/t of the entire lens structure is sufficient to provide a desired level of cornea oxygenation. In addition, the thickness and structural strength of the core 312 may be chosen to accommodate a payload.

In some embodiments, the outer and inner layers of a contact lens 120 each have a thickness of approximately 100 um. In cases, the outer and inner layers may each be between about 10 um and about 300 um in thickness. In some embodiments, the upper air gap and lower air gap are each less than 100 um in thickness (e.g., about 75 um thick). However, in other cases, the air gaps may be as thick as up to 300 um, or as thin as about 0.1 um or less. The core 312 of the contact lens 120 is sized to be capable of carrying a payload, such as an active payload, if desired, and may be as thick as about 1 mm or more, about 0.5 mm or more, and typically is at least 0.1 mm thick.

In another embodiment (not shown), the outer layer 310 does not extend along the entire area of the contact lens 120. Instead, it lies outside a central zone of the contact lens 120 corresponding to the iris of the user's eye, such that it may have an annular shape and is located along the peripheral zones of the contact lens 120. In such embodiments, the air gaps located only within the outer layer 310. This configuration may reduce the overall thickness of the contact lens 120 and may thus reduce the amount of material that light passes through to reach the eye, potentially reducing optical distortions caused by the material. Additional details regarding this embodiment are described in U.S. patent application Ser. No. 16/184,242, filed Nov. 8, 2018, which is incorporated by reference herein in its entirety.

The payload of the core 312 may include a variable focal length lens 326, as shown in the figure. The variable focal length lens 326 may include one or more layers. One of these layers may include liquid crystals or other material with a variable index of refraction that changes in response to an applied input, such as an electromagnetic field. The input may be applied using one or more transparent electrodes, using variations in voltage, amplitude, and/or frequency of an electric current applied to the electrodes. Each of the liquid crystals in the variable focal length lens 326 may have a default state corresponding to a particular index of refraction when no input is applied. In some embodiments, the default state corresponds to operation in a normal focus mode.

Light entering the variable focal length lens 326 is refracted to different degrees based on the index of refraction of the liquid crystal layer in the lens. Thus, by adjusting the index of refraction within the liquid crystal layer of the variable focal length lens 326, the focal distance of the variable focal length lens can be adjusted, aiding a wearer in focusing on nearby objects.

The variable focal length lens 326 can be configured to operate in the normal focus mode and a reading mode. When the variable focal length lens 326 is configured to operate in the normal focus mode, the focal distance of the variable focal length lens is adjusted to allowed objects at or beyond a selected distance (e.g., 15 cm) to be in focus on the user's retina. When the variable focal length lens 326 is configured to operate in the reading mode, the focal distance of the variable focal length lens is adjusted to allow objects within that same distance of a user to be in focus on the user's retina.

In some embodiments, configuring the variable focal length lens 326 to operate in the reading mode includes selecting a focal distance (for instance, based on a distance an object is from a user), and configuring the variable focal length lens based on the selected focal distance. When the distance between the object and the user changes, the variable focal length lens 326 can be re-configured based on a new selected focal distance (e.g., the new distance between the object and the user). Thus, it should be noted that in practice, operation of the variable focal length lens in the reading mode can include operating at any number of focal distance configurations.

To determine the refractive index of the variable focal length lens 326 during operation in the reading mode for the user, the contact lens 120 may be configured to operate in a calibration mode. The contact lens 120 may be configured to operate in the calibration mode when the contact lens 120 is first used by the user (e.g., during setup of the contact lens), or in response to an input from the user. During the calibration mode, the user may view some object within a proximity of the user while wearing the contact lens 120. The user may then adjust a setting of the electronic contact lens system 100 to vary the refractive index of the variable focal length lens 326 until the object can be clearly seen by the user. Alternatively, the electronic contact lens system 100 may automatically vary the refractive index of the variable focal length lens 326, for instance until a user provides an input indicating that the object is clearly seen. The refractive index of the variable focal length lens 326, at the point at which the user provided the input, may then be used by the contact lens 120 in subsequent operation of the contact lens in the reading mode. In some embodiments, the calibration process may also performed under the guidance of an expert, such as an optometrist.

The electronic contact lens system 100 may receive one or more types of input to configure the contact lens 120 to operate in the reading mode. For instance, the electronic contact lens system 100 may receive an input from a user via a connected device (such as a smartphone, the necklace 110, or any other suitable device). Likewise, the electronic contact lens system 100 may receive a voice input, such as a spoken command, from a user associated with operation in the reading mode, using an audio processing system such as a speech recognition system. These inputs may occur at any time to cause the electronic contact lens system 100 to change to the reading mode.

The electronic contact lens system 100 may receive the input via a hand gesture, which may be captured by a camera connected to the electronic contact lens system 100 and analyzed using a hand gesture recognition system. The hand gesture may be, for example, a tap of the user's head by the user's finger, or may a movement of the user's index and thumb, upwards to a side of the user's eye opposite to the nose bridge, as if to move an imaginary set of bi-focal lenses up. The electronic contact lens system 100 may receive the input to configure the contact lens 120 to operate in a reading mode via a head or eye movement or gesture. Various sensors, such as an accelerometer, gyroscope, and so on, may be embedded in the contact lens 120 in order to detect a movement pattern of the user's eyes and/or head. Additional details regarding the tracking of the user's eye using sensors are described in U.S. patent application Ser. No. 16/005,379, filed on Jun. 11, 2018, and which is incorporated by reference herein in its entirety.

The electronic contact lens system 100 may also be configured to operate in the reading mode in response to detecting a vergence of both eyes of the user. For example, the electronic contact lens system 100 may determine the gaze direction and/or the representative field of view of the user's eyes using one or more cameras including one or more image sensors, accelerometers, gyroscopes, and/or other circuits in the electronic contact lens system 100, such as on the contact lens 120 of one or both eyes of the user. When the electronic contact lens system 100 determines that the user's gaze direction converges to a threshold degree (e.g., 30 degrees), indicating that the user is looking at an object closer than the selected distance, the electronic contact lens system 100 may configure the contact lens 120 to operate in the reading mode. This threshold degree may be calibrated during the calibration mode. Conversely, when the electronic contact lens system 100 determines that the vergence of the user's eyes exceeds a threshold degree indicating that the user is looking at an object further than the threshold distance, the electronic contact lens system 100 may configure the contact lens 120 to operate in the normal focus mode. The transition between the normal focus mode and the reading mode may be gradual. Alternatively, the contact lens 120 may adjust the focal length of the variable contact lens 326 continuously in proportion to the amount of vergence of the user's eyes.

In some embodiments, the electronic contact lens system 100 can detect a vergence of the user's eyes by determining that a distance between fixed points within the contact lens is less than a threshold distance. The distance may be determined using circuits or sensors embedded within the contact lenses that are configured to determine a proximity to each other. These circuits or sensors may include sonar acoustic sensors that are capable of sensing signals transmitted by sonar transmitters located within each contact lens 120 to determine a distance between the fixed points of the eyes.

The electronic contact lens system 100 may be configured to operate in a reading mode in response to determining that the user is looking at an object that is within the threshold distance of the user's eyes. For instance, the electronic contact lens system 100 may include a depth-measuring device configured to determine a distance of objects from a user, for instance embedded within the contact lens 120, necklace 110, or an accessory or clothing item worn by the user. The contact lens may also be configured to operate in a reading mode when it detects that the user is reading, i.e., when text is detected in front of the user's eyes using image recognition.

The electronic contact lens system 100 may be configured to operate in the reading mode in response to detecting that the user is looking downward, i.e., the user's iris moves towards the base of the user's head. To detect that the user is looking downwards, the electronic contact lens system 100 may detect an orientation of the user's head and/or eye(s) using an accelerometer and/or gyroscope, which may be embedded in the contact lens 120. Alternatively, the electronic contact lens system 100 detects that the user's head is looking downwards by detecting that the user's bottom eyelid has covered a threshold portion of the bottom of the contact lens 120 using a sensor, such as a capacitive sensor embedded within the contact lens 120. In another case, the electronic contact lens system 100 detects that the user's head is looking downwards by detecting that the user's top eyelid has moved a threshold amount.

In the above cases, the same input or different inputs may be used to switch back and forth between the normal focus mode and the reading mode.

Although the variable focal length lens 326 is shown as being flat in shape, in other embodiments the variable focal length lens 326 may have a different shape, such as a curved shape, as described below with reference to FIGS. 5A-5B.

Furthermore, although reference is made to a liquid crystal layer in the variable focal length lens 326, in other embodiments the variable focal length lens 326 includes a liquid lens. The liquid lens may comprise two different liquids with different indexes of refraction. These liquids may be immiscible (i.e., will not mix with each other), and an application of a voltage to the interface between the two liquids causes the curvature of the boundary between the two liquids to change, thereby creating a lens. The two liquids may include a non-conductive oil and water solution, and may be separated by an interface material.

By adjusting the focal length of the lens 326 for a user, the user is able to use a single device (the contact lens 120) to view both near and far objects, without having to rely on multiple lens pieces (e.g., reading glasses and distance glasses) or on lenses having multiple regions each corresponding to a different focal distance (e.g., a bi-focal lens). Instead, the same portion of the wearer's field of view may have a single focal length, and this focal length can be changed dynamically without having to carry additional lenses. The structure shown in FIGS. 3 and 4 permits the contact lens 120 to carry the oxygen impermeable, variable focal length lens 326 as a payload yet still provide adequate corneal oxygenation.

In one embodiment, instead of changing focal lengths for a reading mode and a normal mode, the variable focal length lens 326 changes focal length along a continuous path based on the distance between the user and an object.

Figure 4:
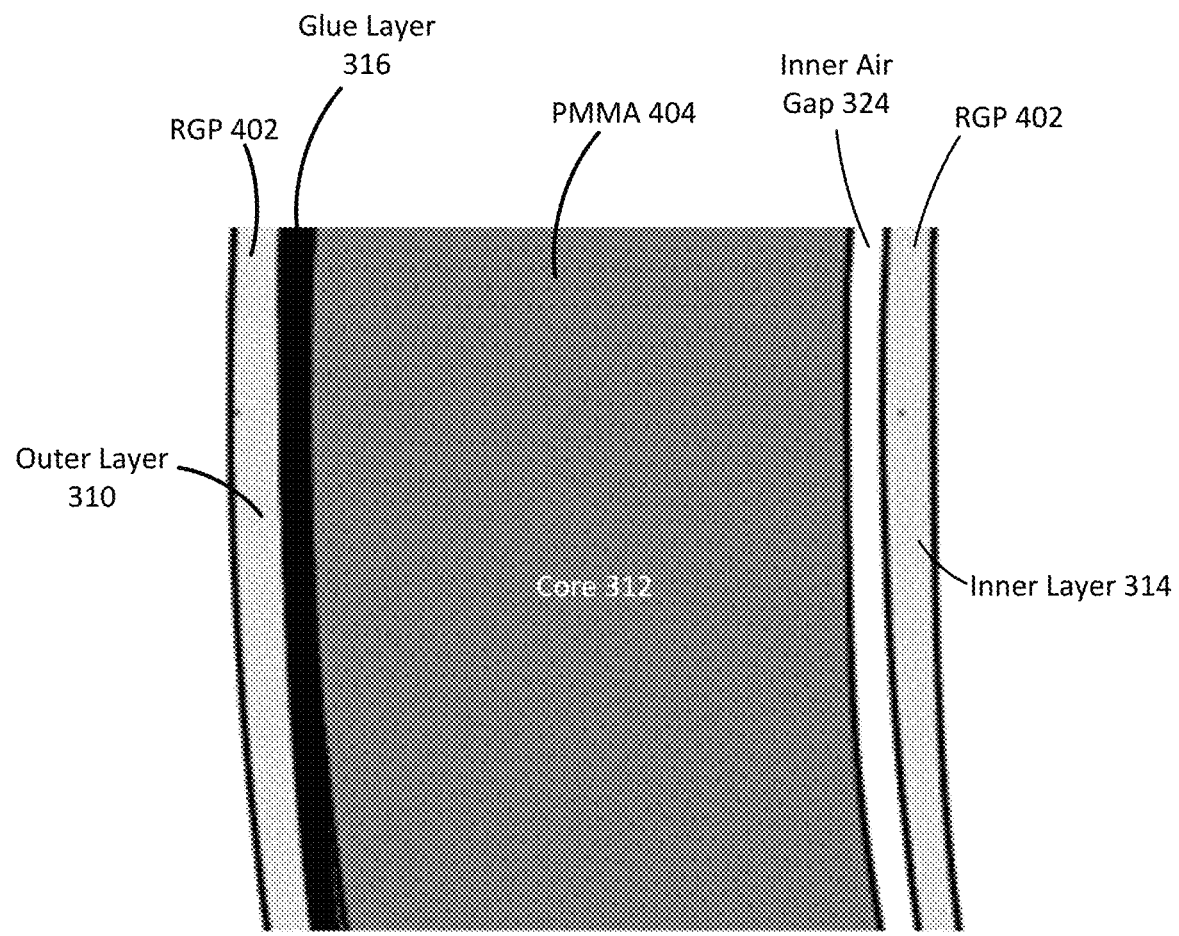
FIG. 4 is a detailed view of the cross section of the dual-gap contact air-permeable contact lens.

FIG. 4 is a detailed view of the cross section of the dual-gap contact air-permeable lens structure, according to an embodiment. The outer layer 310 of the contact lens 120 may be comprised of an RGP (rigid gas-permeable) 402 material, which is attached using the glue layer 316 to the core 312, which may be comprised of a PMMA material 312. At points along the contact lens 120, an air gap may be present instead of the glue layer 316. The inner air gap 324 layer resides between the core 312 and the inner layer 314, which may also be comprised of the RGP 402 material.

Variable Focal Length Lens Shape Variations

Figure 5A:
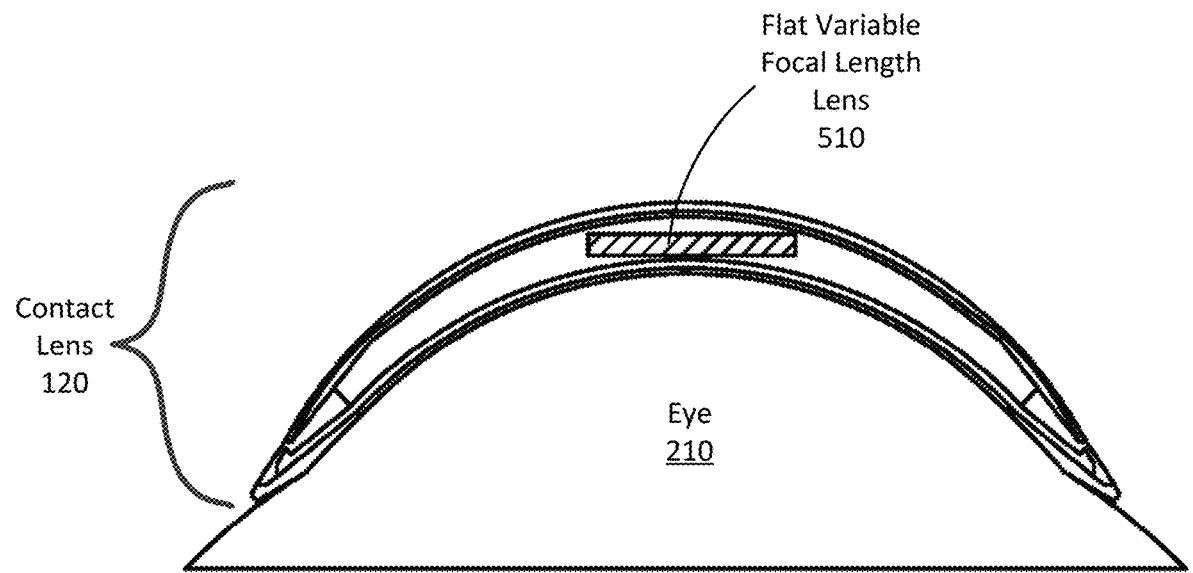
FIG. 5A is a cross sectional view of the electronic contact lens on a wearer's eye with a flat variable focal length lens.

FIG. 5A is a cross sectional view of the electronic contact lens on a wearer's eye with a flat variable focal length lens, according to an embodiment. The flat variable focal length lens 510 may be, for instance, a circular flat disk between 1 mm and 5 mm in diameter, and may be embedded at a location which covers the user's iris.

Figure 5B:
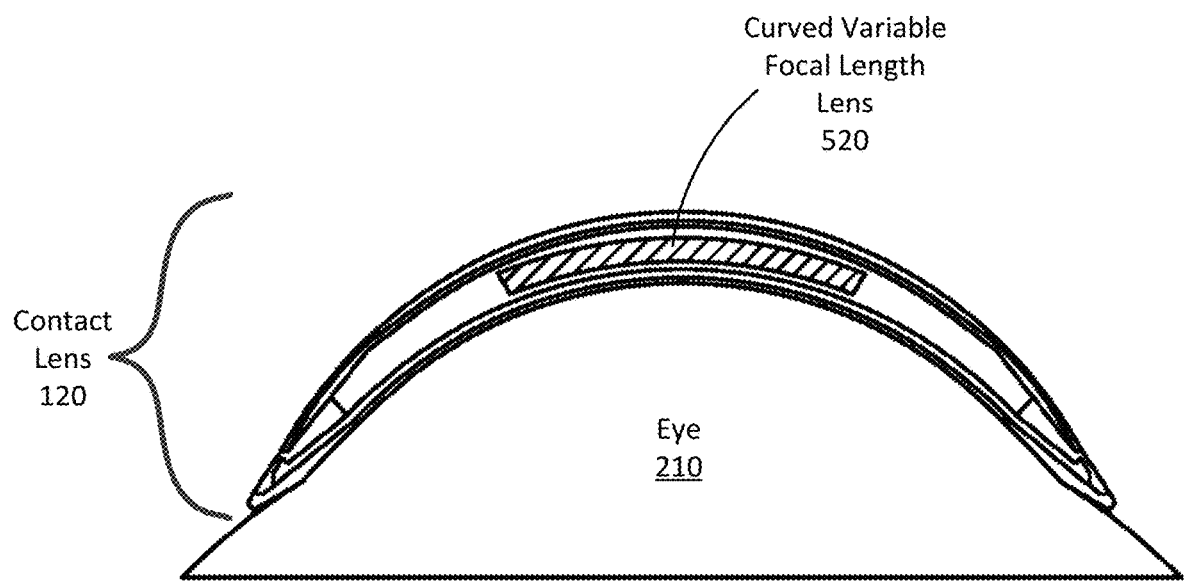
FIG. 5B is a cross sectional view of the electronic contact lens on a wearer's eye with a curved variable focal length lens.

FIG. 5B is a cross sectional view of the electronic contact lens on a wearer's eye with a curved variable focal length lens 520, according to an embodiment. In contrast to the flat variable focal length lens 510 in FIG. 5A, the variable focal length lens in FIG. 5B is curved in shape. The shape of the curved variable focal length lens 520 allows for a larger lens to be embedded within the contact lens 120 than a flat variable focal length lens. For instance, the curved variable focal length lens 520 may have a diameter between 2 mm and 8 mm.

Due to the shape of the flat and curved variable focal length lenses, the refractive index of each lens may differ at different regions of each lens in order for light incident upon the lens to be uniformly focused on the user's retina. In order to achieve this uniform focus, the refractive index of the variable focal length lens may be adjusted to be different at different regions of the variable focal length lens such that light incident upon different areas of the lens are in focus when reaching the retina.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An electronic contact lens comprising:
   an outer air gap contained within the contact lens that receives oxygen through an oxygen-permeable outer layer of the contact lens;
   an inner air gap contained within the contact lens that transmits oxygen to a user's cornea through an oxygen-permeable inner layer of the contact lens;
   one or more oxygen channels that connect the outer air gap to the inner air gap; and
   a variable focal length lens that is adjustable to different focal lengths, wherein oxygen flow to the user's cornea is primarily through the oxygen channels rather than through the variable focal length lens.

2. The electronic contact lens of claim 1 wherein a controller operates the variable focal length lens (a) in a first mode where the focal length is adjusted to focus objects located at a nearer distance from the user, and (b) in a second mode where the focal length is adjusted to focus objects at a farther distance from the user.

3. The electronic contact lens of claim 2 wherein the controller operates the variable focal length lens in the first mode, responsive to detection of text in the user's field of view.

4. The electronic contact lens of claim 2 wherein the controller operates the variable focal length lens in the first mode, responsive to detection of eye movement indicative of reading.

5. The electronic contact lens of claim 2 wherein the controller operates the variable focal length lens in additional modes where the focal length is adjusted to focus objects at distances between the nearer distance and the farther distance.

6. The electronic contact lens of claim 1 wherein a controller adjusts the focal length of the variable focal length lens based on a vergence of the user's two eyes.

7. The electronic contact lens of claim 1 wherein a controller adjusts the focal length of the variable focal length lens based on a movement of the user's eye or of the user's head.

8. The electronic contact lens of claim 1 wherein a controller adjusts the focal length of the variable focal length lens based on a gesture of the user.

9. The electronic contact lens of claim 1 wherein the variable focal length lens is a liquid lens.

10. The electronic contact lens of claim 1 further comprising:
a controller that adjusts the focal length of the variable focal length lens; and
a battery that powers the controller and the variable focal length lens.

11. The electronic contact lens of claim 10 further comprising:
a sensor, wherein the controller adjusts the focal length based on data captured by the sensor and a control path from the sensor to the controller to the variable focal length lens is contained entirely within the electronic contact lens.

12. The electronic contact lens of claim 1 further comprising:
a core containing the variable focal length lens; wherein the outer air gap is formed between the oxygen-permeable outer layer and the core, the inner air gap is formed between the core and the oxygen-permeable inner layer, and at least one oxygen channel traverses through the core.

13. The electronic contact lens of claim 1 wherein a controller operates the variable focal length lens in a calibration mode to calibrate adjustment of the focal length of the variable focal length lens.

14. The electronic contact lens of claim 1 wherein the electronic contact lens comprises a scleral contact lens.

15. An electronic contact lens system comprising:
a pair of electronic contact lenses mountable on a user's two eyes, each electronic contact lens comprising:
an outer air gap contained within the contact lens that receives oxygen through an oxygen-permeable outer layer of the contact lens;
an inner air gap contained within the contact lens that transmits oxygen to a user's cornea through an oxygen-permeable inner layer of the contact lens;
one or more oxygen channels that connect the outer air gap to the inner air gap;
a variable focal length lens that is adjustable to different focal lengths, wherein oxygen flow to the user's cornea is primarily through the oxygen channels rather than through the variable focal length lens;
one or more sensors contained in the two electronic contact lenses, which capture data indicative of a vergence of the user's two eyes; and
a controller that adjusts the focal lengths of the variable focal length lenses in the two electronic contact lenses, based on the data captured by the one or more sensors.

16. The electronic contact lens system of claim 15 wherein the data captured by the one or more sensors is indicative of a distance between fixed points on the two electronic contact lenses.

17. The electronic contact lens system of claim 15 wherein the data captured by the one or more sensors is indicative of a relative positioning of the two electronic contact lenses.

18. The electronic contact lens system of claim 17 wherein the one or more sensors includes accelerometers contained in each of the two electronic contact lenses.

19. The electronic contact lens system of claim 15 wherein:
the controller comprises a controller in each electronic contact lens that adjusts the focal length of the variable focal length lens; and
each electronic contact lens further comprises a sensor, and each controller adjusts the focal length based on data captured by the sensor and a control path from the sensor to the controller to the variable focal length lens is contained entirely within the electronic contact lens.

20. The electronic contact lens system of claim 19 wherein each electronic contact lens further comprises:
a core containing the variable focal length lens; wherein the outer air gap is formed between the oxygen-permeable outer layer and the core, the inner air gap is formed between the core and the oxygen-permeable inner layer, and at least one oxygen channel traverses through the core.

* * * * *